United States Patent [19]
Palavecino et al.

[11] Patent Number: 5,774,517
[45] Date of Patent: Jun. 30, 1998

[54] REGULATION OF THE CORE COOLANT FLOW RATE OF A NATURAL CIRCULATION REACTOR

[75] Inventors: Carlos Palavecino, Neu Isenburg; Herbert Schmidt, Erzhausen, both of Germany

[73] Assignee: Siemens Aktiengesellschaft, Munich, Germany

[21] Appl. No.: 828,722

[22] Filed: Mar. 21, 1997

Related U.S. Application Data

[63] Continuation of PCT/DE95/01298, Sep. 21, 1995 published as WO96/09628, Mar. 28, 1996.

[30] Foreign Application Priority Data

Sep. 21, 1994 [DE] Germany .......................... 44 33 702.7

[51] Int. Cl.⁶ .............................. G21C 1/08; G21C 15/02
[52] U.S. Cl. ......................... 376/352; 376/210; 376/377
[58] Field of Search .................................. 376/210, 282, 376/328, 352, 399, 373, 377

[56] References Cited

U.S. PATENT DOCUMENTS

| | | | |
|---|---|---|---|
| 3,429,775 | 2/1969 | Petersen | 376/377 |
| 4,877,574 | 10/1989 | Suzuki et al. | 376/210 |
| 5,073,335 | 12/1991 | Townsend | 376/373 |
| 5,120,493 | 6/1992 | Marquino et al. | 376/399 |
| 5,303,275 | 4/1994 | Kobsa | 376/352 |

FOREIGN PATENT DOCUMENTS

| | | |
|---|---|---|
| 0 403 222 A2 | 12/1990 | European Pat. Off. . |
| 1 136 490 | 11/1955 | France . |
| 1 071 854 | 12/1959 | Germany . |
| 1 094 381 | 12/1960 | Germany . |
| 1 804 371 | 5/1970 | Germany . |

OTHER PUBLICATIONS

Japanese Patent Abstract No. JP 1086093 dated 30 Mar. 1989.

Japanese Patent Abstract No. JP 63196884, dated 15 Aug. 1988.

*Primary Examiner*—Daniel D. Wasil
*Attorney, Agent, or Firm*—Herbert L. Lerner; Laurence A. Greenberg

[57] ABSTRACT

A natural circulation reactor, especially a boiling water reactor, includes a reactor pressure vessel, a reactor core and a core jacket disposed within the reactor pressure vessel, surrounding the reactor core and having at least one inlet port and one outlet port for core coolant. A flow path for the core coolant, which is formed between the core jacket and the reactor pressure vessel, leads through the inlet port into the core jacket and has a flow cross section. At least one throttle element is disposed in the flow path for varying the flow cross section in order to regulate the core coolant flow rate. The flow cross section can be both increased and reduced in size by varying the cross sectional area of the throttle element, so that a regulation of the power of the natural circulation reactor is carried out in a simple way and, in an incident, a reduction in power to approximately 40% of the instantaneous reactor power is ensured. A method is also provided for regulating the core coolant flow rate through a reactor core of a natural circulation reactor.

15 Claims, 4 Drawing Sheets

REGULATION OF THE CORE COOLANT FLOW RATE OF A NATURAL CIRCULATION REACTOR

CROSS-REFERENCE TO RELATED APPLICATION

This application is a Continuation of International application Ser. No. PCT/DE95/01298, filed Sep. 21, 1995, published as WO96/09628, Mar. 28, 1996.

BACKGROUND OF THE INVENTION

Field of the Invention

The invention relates to a natural circulation reactor, especially a boiling water reactor, with a reactor pressure vessel, a reactor core and a core jacket which surrounds the reactor core, is disposed within the reactor pressure vessel and has at least one inlet port and one outlet port for core coolant. The invention also relates to a method for regulating the core coolant flow rate through a reactor core of a natural circulation reactor.

The circulation of coolant in a nuclear reactor, especially in a boiling water reactor, can take place in various ways. In a natural circulation reactor, the coolant, especially cooling water, is maintained in natural circulation by virtue of a density difference between the coolant in the reactor core and the coolant in a backflow space located outside the reactor core. The coolant within the reactor core is hotter than it is within the backflow space and, moreover, is substantially lighter as a result of the formation of steam bubbles. Boiling water reactors according to the natural circulation principle, with an electrical plant capacity of below 100 MW, are known. Boiling water reactors of higher electrical plant capacity are operated by forced circulation of the core coolant. In that case, the core coolant is circulated through circulating pumps disposed outside or inside the reactor pressure vessel. The core coolant flow rate through the reactor core can be set, irrespective of the position of control elements introduced into the reactor core, through the use of a control of the circulating pumps. Such a setting of the core coolant flow rate allows a better behavior of the nuclear reactor, especially with regard to the control of incidents, than in boiling water reactors working on the natural circulation principle and having a core coolant flow rate which adjusts automatically as a function of the reactor power.

German Published, Prosecuted Patent Application 1 804 371 describes a sodium-cooled nuclear reactor having fuel assemblies for generating thermal energy which are disposed in respective cooling ducts. The flow of the coolant, namely sodium, through the cooling ducts is regulated individually through respective flow regulators in the form of diaphragms.

The regulation is such that all of the flow regulators are always actuated simultaneously and in the same way. That is intended to counteract the burn-up of the fuel assemblies, taking place over a lengthy period of time, for the purpose of adapting the power distribution.

German Published, Prosecuted Patent Application 1 071 854 treats a gas-cooled nuclear reactor with fuel assemblies which in each case are disposed individually in a corresponding duct. In order to provide improved utilization of the thermal energy generated by the fuel assemblies, the fuel assemblies, that is to say the ducts, are divided into different groups. In that case, the coolant flow rate through the ducts is regulated individually for each group through slides or diaphragms.

The flow rate regulation specified in German Published, Prosecuted Patent Applications 1 071 854 and 1 804 371 relates, in each case, purely to the direct regulation of the coolant flow rate through the cooling ducts of the fuel assemblies and has the sole object of achieving as full a utilization as possible of the thermal energy of the fuel assemblies by the compensation of different geometrical and time-related conditions of the fuel assemblies.

SUMMARY OF THE INVENTION

It is accordingly an object of the invention to provide a natural circulation reactor, especially a boiling water reactor, of high power, and a method for regulating the core coolant flow rate of a natural circulation reactor, which overcome the hereinafore-mentioned disadvantages of the heretofore-known devices and methods of this general type and in which a predeterminable setting of the core coolant flow rate is possible.

With the foregoing and other objects in view there is provided, in accordance with the invention, a natural circulation reactor, especially a boiling water reactor, comprising a reactor pressure vessel; a reactor core; a core jacket disposed within the reactor pressure vessel, surrounding the reactor core, and having at least one inlet port and one outlet port for core coolant, especially cooling water; a flow path for the core coolant formed between the core jacket and the reactor pressure vessel, leading through the at least one inlet port into the core jacket, and having a flow cross section; and at least one throttle element disposed in the flow path for varying the flow cross section to regulate a core coolant flow rate.

It is possible to regulate the core coolant flow rate in a boiling water reactor of high power, for example of an electrical power of 600 MW, by increasing or reducing the size of the flow cross section through the use of the throttle element. Consequently, the advantages of regulating the coolant flow rate of a nuclear reactor operated by forced circulation are now likewise achieved in a nuclear reactor operated on the natural circulation principle, whereby, moreover, circulating pumps can be dispensed with. In the case of a rapid control of power in an incident, especially in the case of a fast shutdown of the boiling water reactor, the power can be run down from 100% to, for example, about 40% by reducing the flow cross section. Suitable variable cross sections are, for example, the annular space formed between the reactor pressure vessel and the core jacket and the total cross section of the inlet port of the core jacket at the bottom of the reactor pressure vessel.

In accordance with another feature of the invention, the throttle element is a swelling body. The swelling body can be constructed as an elastic bellows or concertina which is expanded or reduced in size through the use of a pressure medium, for example compressed air or hydraulic fluid, with the result that the flow cross section of the flow path is changed. Such a bellows or cushion-like swelling body is simple to produce, mechanically stable and can be constructed so as to be resistant to the conditions within the reactor pressure vessel.

In accordance with a further feature of the invention, the throttle element is fastened to a wall of the reactor pressure vessel. Control of the throttle element directly through the wall, especially through a pressure medium, is thereby ensured. Moreover, if appropriate, maintenance of the throttle element can be carried out through the wall, without the reactor pressure vessel having to be opened.

In accordance with an alternative feature of the invention, the throttle element is constructed as a flap rotatable about a center of rotation. The flap is fastened about the center of rotation in such a way that, in the event of the failure of a control provided for operating it, especially in an incident, it is rotated, by virtue of its dead weight and/or of the circulating coolant, especially cooling water, into a position which reduces the size of the flow cross section, with the result that a reduction in power of the nuclear reactor takes place and the latter is therefore brought into a safe state.

In accordance with an added feature of the invention, the center of rotation is located on the core jacket, especially at one end of the rotatable flap. The core coolant circulating in the pressure vessel therefore constantly exerts a torque on the flap which causes the flap to assume a direction of rotation pointed in the direction of flow.

In accordance with an additional feature of the invention, the flap can be moved through the use of a lifting device which, in particular, has a piston capable of being operated by compressed air or a ratchet jack. The ratchet-type lifting device is preferably disposed above the flap and is connected to the latter through a cable traction assembly or a rod, so that the flap can be rotated as desired. The ratchet jack can be disposed on the cover of the reactor pressure vessel, so that only one leadthrough of small cross section through the cover is necessary for connecting the ratchet jack to the flap. The mechanism of the lifting device, which mechanism is disposed within the reactor pressure vessel, especially a fastening device on the flap and the cable traction assembly or the rod, can be of especially simple and robust construction in mechanical terms, so that maintenance work on the lifting device within the reactor pressure vessel is largely unnecessary. A lifting device having a pneumatically or hydraulically operable piston can be disposed both below and above the flap and likewise causes the flap to rotate as desired. It can have a structurally simple and low-maintenance construction.

In accordance with yet another feature of the invention, the throttle element can be disposed in the vicinity of the inlet port, so that the inlet port can be at least partially closed through the use of the throttle element. This configuration of the throttle element can be both outside and inside the core jacket.

In accordance with yet a further feature of the invention, in the event that the inlet port is disposed in a bottom region of the reactor pressure vessel, the throttle element can be controlled hydraulically, pneumatically or electrically, preferably through the bottom of the reactor pressure vessel and, in particular, can be displaced along a main axis of the reactor pressure vessel. Hydraulic or pneumatic control of the throttle element can be operated both with its own medium and with a medium from a separate source.

In accordance with yet an added feature of the invention, the throttle element is a plate, especially a guide blade plate or a slide plate. The plate can run parallel to the main axis of the reactor pressure vessel and therefore essentially parallel to the core jacket or be disposed, relative to the main axis, as an inclined guide blade plate. A plate running parallel to the main axis is preferably constructed as a slide plate which, in the event of rapid control in an incident, comes into a position at least partially closing the inlet port, due to its dead weight. As a result, in an incident, throttling of the core coolant flow rate and consequently a reduction in power of the nuclear reactor, take place. The drive of the plate is preferably disposed outside the bottom of the reactor pressure vessel, so that maintenance work on the throttle element can be carried out largely outside the reactor pressure vessel.

With the objects of the invention in view there is also provided a method for regulating the core coolant flow rate through a reactor core of a natural circulation reactor, especially a boiling water reactor, having a reactor pressure vessel and a core jacket disposed within the reactor pressure vessel, surrounding the reactor core and having at least one inlet port and one outlet port for core coolant, which comprises setting a flow cross section of a flow path formed between the core jacket and the reactor pressure vessel and leading through the inlet port into the core jacket, with at least one throttle element.

This results in a simple and reliable way of providing a regulation of the core coolant flow rate for a nuclear reactor operating by natural circulation, especially a boiling water reactor, of high electrical power, for example of more than 600 MW. The regulation of the core coolant flow rate can be carried out reliably and, in the event of a reduction in size of the flow cross section in an incident, can lead to a power reduction down to 60%. A higher degree of passive safety is achieved through the use of the method, as compared with a regulation of the core coolant flow rate by the use of circulating pumps.

Other features which are considered as characteristic for the invention are set forth in the appended claims.

Although the invention is illustrated and described herein as embodied in a natural circulation reactor, especially a boiling water reactor, and a method for regulating the core coolant flow rate of a natural circulation reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
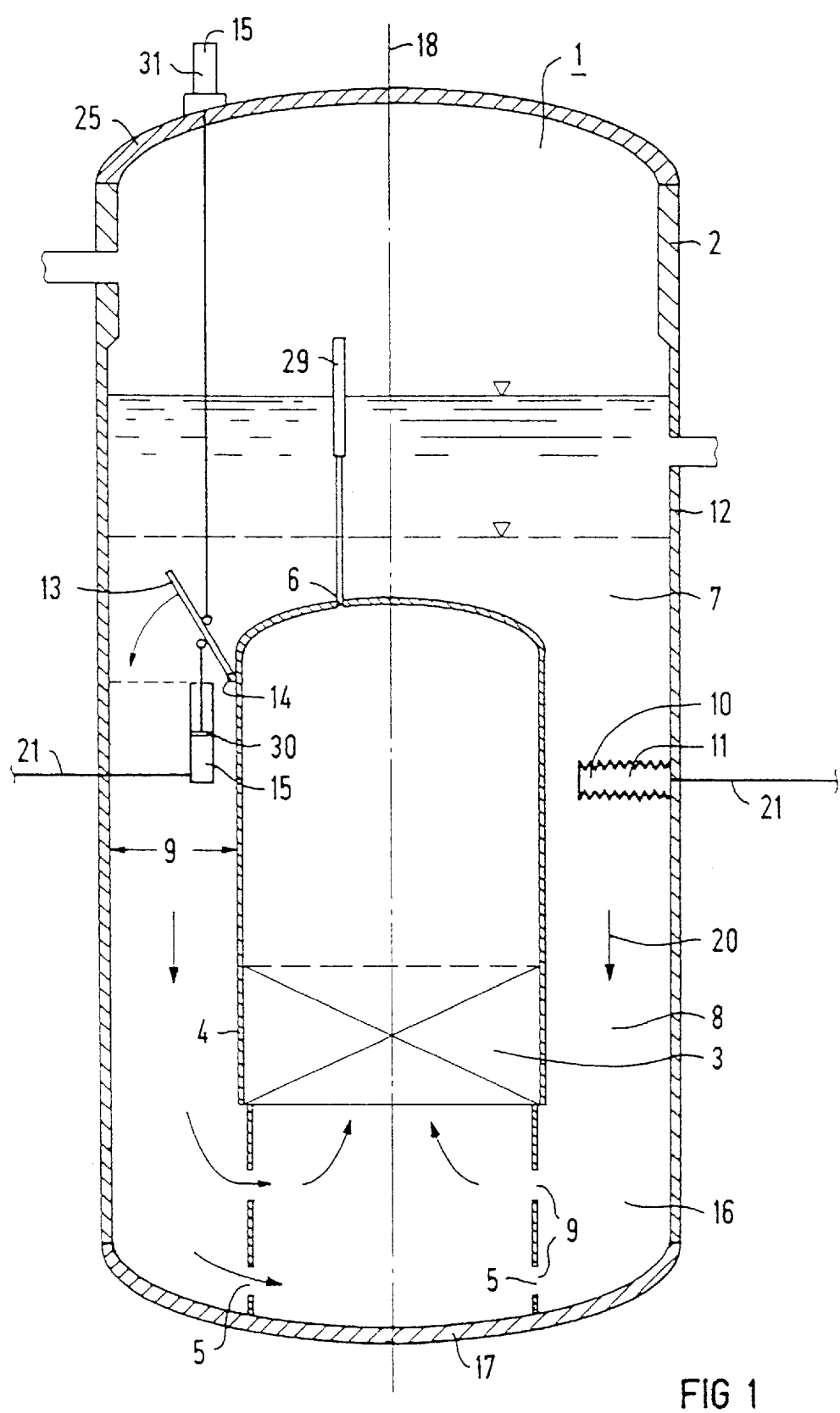
FIG. 1 is a diagrammatic, longitudinal-sectional view of a reactor pressure vessel of a natural circulation reactor.

Referring now in detail to the figures of the drawings, in which only the components of the natural circulation reactor which are necessary for the following explanation are shown, and first, particularly, to FIG. 1 thereof, there is seen a reactor pressure vessel 2 of a natural circulation reactor 1, especially of a boiling water reactor. The reactor pressure vessel 2 has a cover 25 and a bottom 17 and is essentially rotationally symmetrical with respect to a main axis 18. Disposed within the reactor pressure vessel 2 is a reactor core 3 surrounded by a core jacket 4 which is connected to the bottom 17 of the reactor pressure vessel 2 and which is essentially rotationally symmetrical to the main axis 18. The core jacket 4 has inlet ports 5 for core coolant 7, namely cooling water, in a bottom region 16 of the reactor pressure vessel 2 below the reactor core 3. The reactor pressure vessel 2 is filled with core coolant 7 up to a level above the core jacket 4. A side of the core jacket 4 located opposite the bottom 17 of the reactor pressure vessel 2 has outlet ports 6, to each of which a steam separator 29 for the separation of core coolant 7 and coolant steam is connected. Altogether, for example, 397 separators 29 are provided, only one of which is shown for illustration. A flow path 8 for core coolant 7, which is formed between the core jacket 4 and a wall 12 of the reactor pressure vessel 2, continues through the inlet port 5 into the core jacket 4 and the reactor core 3. The direction of flow of the naturally circulated core coolant 7 is indicated by flow arrows 20. A flow cross section 9 of the flow path 8 is formed, along the wall 12, by the area of the annulus between the wall 12 and the core jacket 4. In the bottom region 16 of the reactor pressure vessel 2, the flow cross section 9 is defined by the total area of the inlet ports 5. A throttle element 10 which is constructed as a bellows or cushion-like swelling body 11, is disposed between the wall 12 and the core jacket 4. The swelling body 11 is fastened at one end to the wall 12. A compressed air line 21 is led through the wall 12 into the swelling body 11, and compressed air for lengthening or shortening the swelling body 11 can be respectively introduced or discharged through the compressed air line. Another version of a throttle element 10 is a rotatable flap 13 having a center of rotation 14 which is located on the core jacket 4. A lifting device 15 having a pressure-operable piston 30 is shown below the rotatable flap 13. The piston 30 can be moved up and down in the direction of the main axis 18 and it is connected in an articulated manner to the rotatable flap 13. Pressure can be exerted on the piston 30 through a compressed air line 21, with the result that the piston 30 and therefore also the rotatable flap 13 are moved. Alternatively, the rotatable flap 13 can be moved through the use of a lifting device 15 which has a ratchet jack 31. The ratchet jack 31 is disposed outside the reactor pressure vessel 2 on the cover 25 of the latter.

Different lifting devices 15 can be connected to the rotatable flaps 13, for example for reasons of redundancy. The flow cross section 9 between the core jacket 4 and the wall 12 of the reactor pressure vessel 2 is set through the use of the throttle element 10, the rotatable flap 13 or the swelling body 11. As a result, regulation of the core coolant flow rate and therefore regulation of the power of the boiling water reactor are carried out without any forced circulation through the use of circulating pumps. In the event of control in an incident, a reduction in instantaneous power of 60% can be carried out, for example by a reduction in the flow cross section 9 through the use of the throttle element 10.

Figure 2:
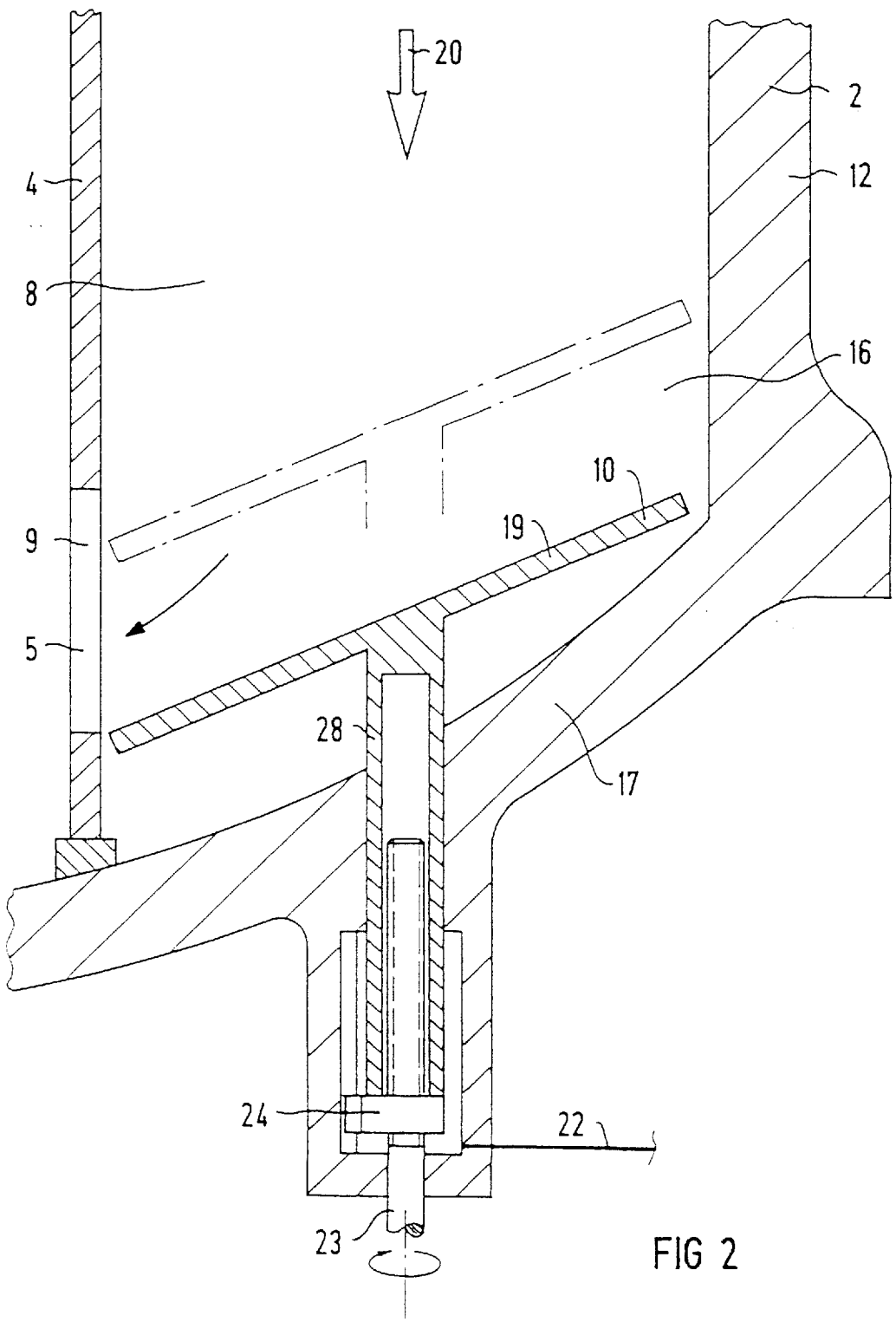
FIG. 2 is an enlarged, fragmentary, longitudinal-sectional view of a lower region of the reactor pressure vessel.

FIG. 2 shows a throttle element 10 which is a plate 19 that is movable along the main axis 18. The plate 19 is inclined relative to the main axis 18, with the result that it causes a deflection of the core coolant 7 in the manner of a guide blade plate. The plate 19 is disposed in the bottom region 16 of the reactor pressure vessel 2 and, in the position shown, causes the core coolant 7 to be deflected into the inlet port 5. The plate 19 can be moved from the position shown in solid lines upward along the main axis 18, so that the plate is located in a position represented by broken lines. Since the plate 19 is elongated between the core jacket 4 and the wall 12 of the reactor pressure vessel, it largely blocks the inlet port 5 for the coolant 7. The plate 19 is connected to a hollow piston 28 extended along the main axis 18. The hollow piston 28 can be displaced along the main axis 18 by a non-illustrated electric spindle drive disposed outside the reactor pressure vessel 2, through a traveling spindle 23 and a traveling nut 24. Alternatively to electrically controlled displacement of the hollow piston 28, hydraulic displacement by a hydraulic fluid fed to the hollow piston 28 through a hydraulic line 22 is possible. The displaceable plate 19 thus likewise makes it possible to regulate the core coolant flow rate in a simple way by varying the flow cross section 9.

Figure 3:
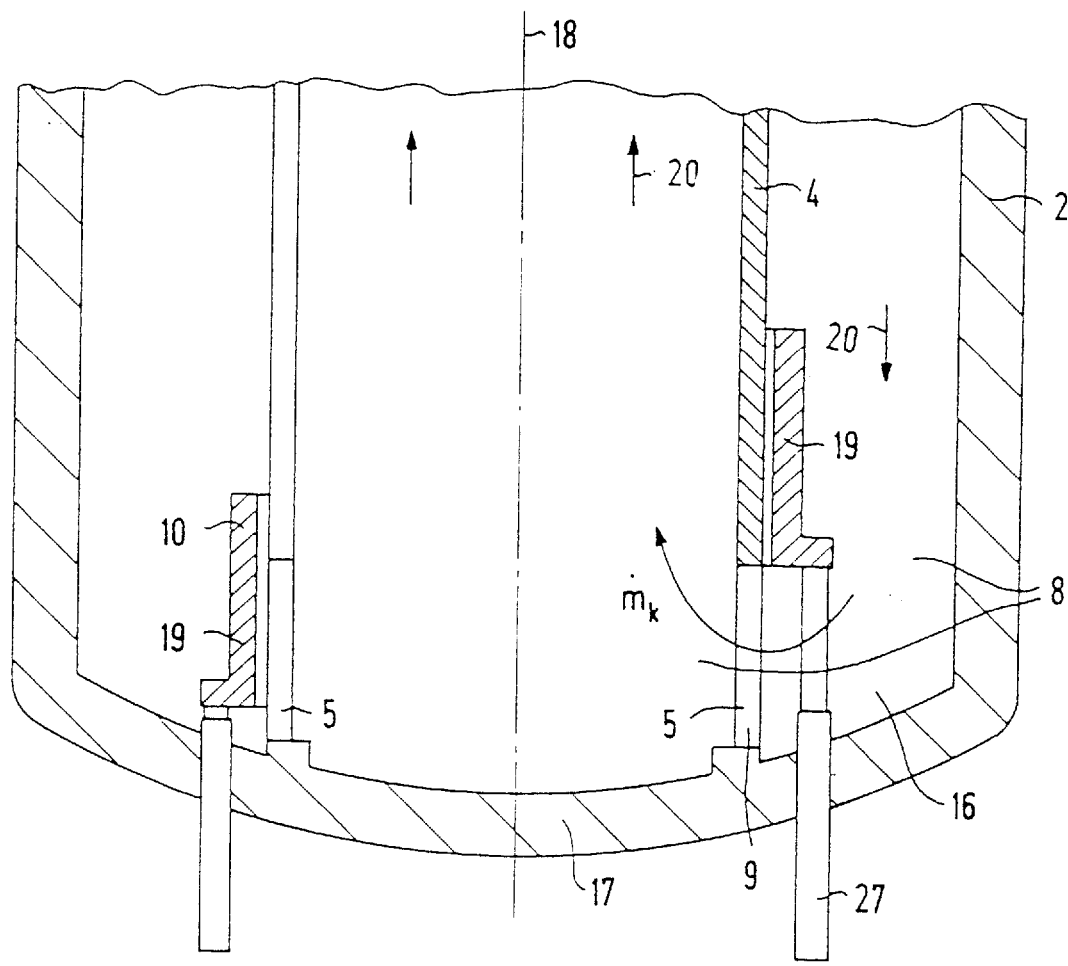
FIG. 3 is a fragmentary, longitudinal-sectional view of a bottom region of the reactor pressure vessel.

FIG. 3 shows a longitudinal section of a portion of the reactor pressure vessel 2 at the bottom region 16. The core jacket 4 has an inlet port 5 on each of the two sides of the main axis 18, in the immediate vicinity of the bottom 17. A plate 19, which extends along the main axis 18, is disposed between the core jacket 4 and reactor pressure vessel 2 at each inlet port 5. Each plate 19 is connected through the bottom 17 to a respective slide drive 27 outside the reactor pressure vessel 2. The plate 19 can be displaced along the main axis 18 between a "minimum opening" position shown at the left-hand plate 19 in which the inlet port 5 is essentially closed, and a "maximum opening" position shown at the right-hand plate 19 in which the inlet port 5 is completely open. Through the use of the plate 19 closing the inlet port 5, the flow cross section 9 of the flow path 8 can be varied in such a way that it becomes possible to regulate the core coolant flow rate and therefore the power of the natural circulation reactor, for example within a range of 40%–100%.

Figure 4:
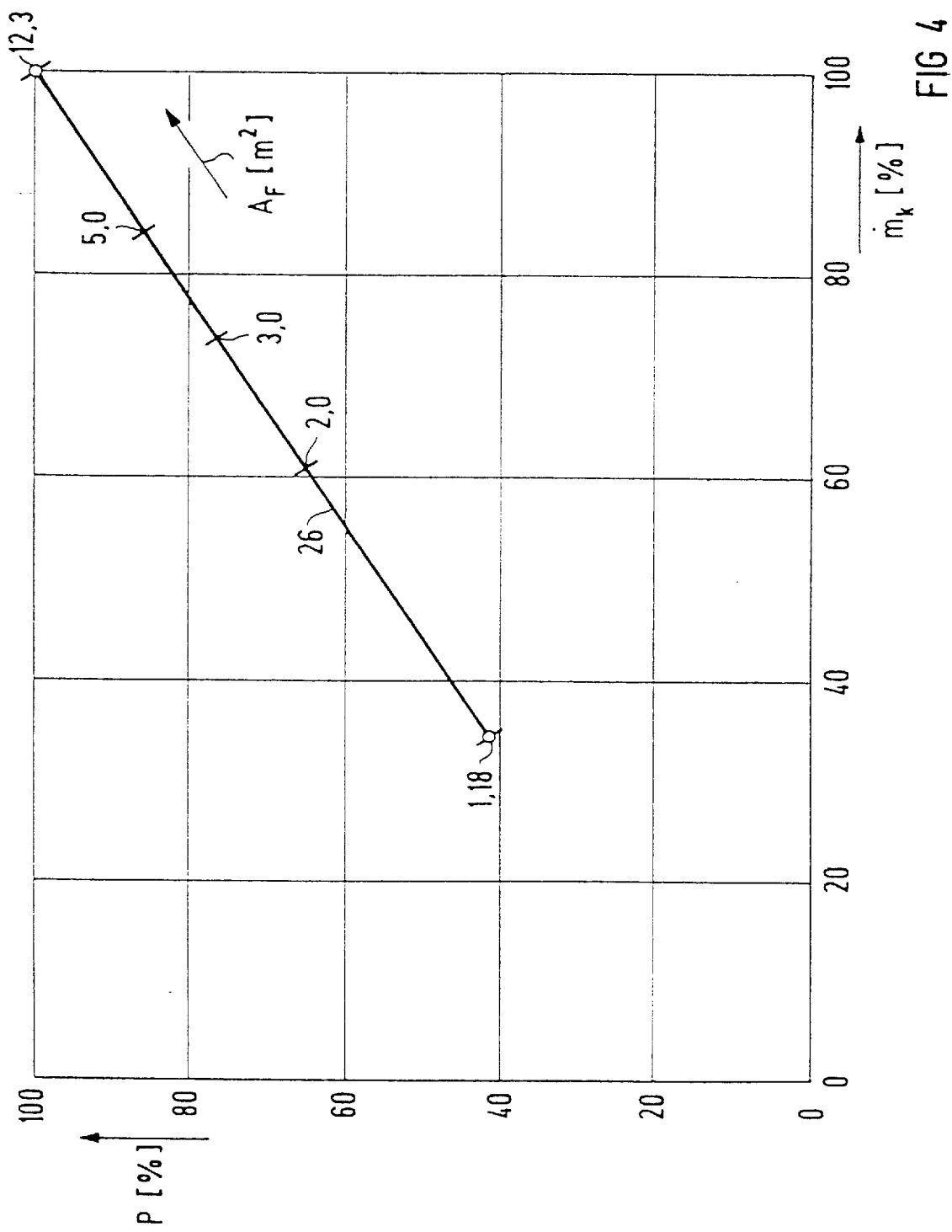
FIG. 4 is a graph showing a reactor circulation regulating characteristic as a function of the flow cross-section.

FIG. 4 shows a reactor circulation regulation characteristic 26 as a function of an area AF formed by the flow cross section 9 between the core jacket 4 and the wall 12 of the reactor pressure vessel 2. The reactor pressure vessel 2 has a diameter of about 7 m and the core jacket 4 a diameter of about 6 m, so that the maximum flow cross section 9 between the core jacket 4 and reactor pressure vessel 2 is about 12.3 m$^2$. In the event of a reduction in the area AF, for example to 1.18 m$^2$, a core coolant flow rate $m_k$ falls to below 40% and the thermal power P of the natural circulation reactor falls to about 40%. Thus, a reduction in power of 60% can be achieved by reducing the flow cross section in an incident to about 10% of the maximum flow cross section 9.

The invention is distinguished by providing at least one throttle element in a flow path for core coolant. The flow cross section of the flow path can be varied through the use of the throttle element. Regulation of the core coolant flow rate is thereby achieved in a simple way, and especially in the case of rapid control in an incident, the flow cross section can be reduced until the reactor power is reduced by 60%. The throttle element can be controlled hydraulically, pneumatically or electrically, for example through a pressure piston, a ratchet jack or an electric spindle drive. Regulation of the core coolant flow rate is likewise possible for a boiling water reactor of high power, for example of an electrical power of more than 600 MW. In comparison with forced circulation of the core coolant through the use of circulating pumps, regulation of the core coolant flow rate through the use of throttle elements is less susceptible to faults. In particular, the problem of possible incidents caused by pipeline fractures in the pipelines of the circulating pumps is avoided. The throttle elements can be of passive construction, so that in the event of a failure of their drive, a reduction in the flow cross section and therefore a reduction in the power of the natural circulation reactor take place automatically.

We claim:
1. A natural circulation reactor, comprising:
a reactor pressure vessel;
a reactor core;
a core jacket disposed within said reactor pressure vessel, surrounding said reactor core, and having at least one inlet port and one outlet port for core coolant;

a flow path for the core coolant formed between said core jacket and said reactor pressure vessel, leading through said at least one inlet port into said core jacket, and having a flow cross section; and at least one throttle element disposed in said flow path for varying said flow cross section to regulate a core coolant flow rate, and said at least one throttle element being a swelling body disposed outside said core jacket.

2. The natural circulation reactor according to claim 1, wherein said swelling body can be swelled by a pressure medium.

3. The natural circulation reactor according to claim 1, wherein said swelling body can be swelled by compressed air.

4. The natural circulation reactor according to claim 1, wherein said reactor pressure vessel has a wall, and said at least one throttle element is fastened to said wall.

5. The natural circulation reactor according to claim 1, wherein said at least one inlet port can be at least partially closed by said swelling body.

6. A natural circulation reactor, comprising:

a reactor pressure vessel having a main axis and a bottom region with a bottom;

a reactor core;

a core jacket disposed within said reactor pressure vessel, surrounding said reactor core, and having at least one inlet port and one outlet port for core coolant;

a flow path for the core coolant formed between said core jacket and said reactor pressure vessel, leading through said at least one inlet port into said core jacket, and having a flow cross section; and at least one throttle element disposed in said flow path for varying said flow cross section to regulate a core coolant flow rate, said at least one inlet port is disposed in said bottom region, and said at least one throttle element is displaceable through said bottom.

7. The natural circulation reactor according to claim 6, wherein said at least one throttle element is displaceable in a direction of said main axis.

8. The natural circulation reactor according to claim 6, wherein said at least one throttle element is displaceable by electrical control.

9. The natural circulation reactor according to claim 6, wherein said at least one throttle element is displaceable by hydraulic control.

10. The natural circulation reactor according to claim 6, wherein said at least one throttle element is displaceable by pneumatic control.

11. The natural circulation reactor according to claim 6, wherein said at least one throttle element is a plate.

12. The natural circulation reactor according to claim 6, wherein said at least one throttle element is a guide blade plate.

13. The natural circulation reactor according to claim 6, wherein said at least one throttle element is a slide plate.

14. In a method for regulating the core coolant flow rate through a reactor core of a natural circulation reactor having a reactor pressure vessel and a core jacket disposed within the reactor pressure vessel, surrounding the reactor core and having at least one inlet port and one outlet port for core coolant, the improvement which comprises:

varying a swelling of at least one throttle element for controlling a flow cross section of a flow path formed between the core jacket and the reactor pressure vessel and leading through the inlet port into the core jacket.

15. In a method for regulating the core coolant flow rate through a reactor core of a natural circulation reactor having a reactor pressure vessel and a core jacket disposed within the reactor pressure vessel, surrounding the reactor core and having at least one inlet port and one outlet port for core coolant, the improvement which comprises:

displacing at least one throttle element through a bottom of the reactor pressure vessel for varying a flow cross section of the at least one inlet port.

* * * * *